(12) United States Patent
Christensen et al.

(10) Patent No.: US 12,131,190 B2
(45) Date of Patent: Oct. 29, 2024

(54) MANAGEMENT OF A COMPUTING DEVICE USAGE PROFILE

(71) Applicant: Micron Technology, Inc., Boise, ID (US)

(72) Inventors: Carla L. Christensen, Golden Valley, ID (US); Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 764 days.

(21) Appl. No.: 17/180,514

(22) Filed: Feb. 19, 2021

(65) Prior Publication Data

US 2022/0269542 A1 Aug. 25, 2022

(51) Int. Cl.
| G06F 9/46 | (2006.01) |
| G06F 3/06 | (2006.01) |
| G06F 9/50 | (2006.01) |
| G06F 11/30 | (2006.01) |
| G06F 11/34 | (2006.01) |
| H04L 67/10 | (2022.01) |
| H04L 67/50 | (2022.01) |

(52) U.S. Cl.
CPC .......... G06F 9/5016 (2013.01); G06F 3/0604 (2013.01); G06F 3/0659 (2013.01); G06F 3/0673 (2013.01); G06F 11/3024 (2013.01); G06F 11/3433 (2013.01); H04L 67/10 (2013.01); H04L 67/535 (2022.05)

(58) Field of Classification Search
CPC .................................................. G06F 9/5016
USPC ........................................................ 718/104
See application file for complete search history.

(56) References Cited

U.S. PATENT DOCUMENTS

| 8,825,784 | B2 * | 9/2014 | Ramnani | H04W 8/18 |
| | | | | 709/206 |
| 8,966,462 | B2 * | 2/2015 | Gounares | G06F 9/5016 |
| | | | | 717/148 |
| 9,397,987 | B1 * | 7/2016 | Lai | G06Q 30/0601 |
| 9,424,509 | B2 * | 8/2016 | Ashrafi | G06F 8/71 |
| 9,547,666 | B2 * | 1/2017 | Ching | H04L 67/306 |
| 9,760,479 | B2 * | 9/2017 | Colgrove | G06F 3/0631 |
| 10,452,440 | B1 * | 10/2019 | Odulinski | G06F 9/485 |
| 10,939,349 | B2 * | 3/2021 | Pati | H04W 36/245 |
| 11,252,149 | B1 * | 2/2022 | Bang | G06F 3/167 |
| 11,783,082 | B2 * | 10/2023 | Obaidi | G06N 20/00 |
| | | | | 726/26 |
| 11,785,694 | B2 * | 10/2023 | Hamm | H05B 47/11 |
| | | | | 315/294 |
| 2002/0002705 | A1 * | 1/2002 | Byrnes | G06Q 30/02 |
| | | | | 725/14 |
| 2006/0026268 | A1 * | 2/2006 | Sanda | G06F 9/5011 |
| | | | | 709/224 |

(Continued)

*Primary Examiner* — Mehran Kamran
(74) *Attorney, Agent, or Firm* — Brooks, Cameron & Huebsch, PLLC

(57) ABSTRACT

Methods, systems, and apparatuses related to management of a computing device usage profile are described. The usage profile can be a usage profile of a computing device. Characteristics of workloads executed by a computing device can be monitored to determine whether performance of the computing device can be optimized by execution of an updated usage profile. Responsive to a determination that the performance of the computing device can be improved by execution of an updated usage profile, the updated usage profile can be received by the computing device and executed thereon.

21 Claims, 5 Drawing Sheets

(56) References Cited

U.S. PATENT DOCUMENTS

| | | | |
|---|---|---|---|
| 2007/0150599 A1* | 6/2007 | Neogi | G06F 16/217 709/227 |
| 2008/0262822 A1* | 10/2008 | Hardwick | G06F 11/3457 703/21 |
| 2008/0262823 A1* | 10/2008 | Oslake | G06F 8/20 703/22 |
| 2010/0131959 A1* | 5/2010 | Spiers | G06F 9/50 718/105 |
| 2010/0144318 A1* | 6/2010 | Cable | H04L 67/306 455/414.2 |
| 2012/0149417 A1* | 6/2012 | Akhtar | G06F 16/9574 455/509 |
| 2013/0310163 A1* | 11/2013 | Smith | G07F 17/3241 463/29 |
| 2014/0095693 A1* | 4/2014 | Apte | H04L 67/535 709/224 |
| 2014/0141768 A1* | 5/2014 | Javaid | H04W 4/50 455/423 |
| 2015/0161385 A1* | 6/2015 | Gounares | G06F 21/577 726/25 |
| 2015/0280979 A1* | 10/2015 | Pesonen | H04L 67/535 709/222 |
| 2015/0350885 A1* | 12/2015 | Stanley-Marbell | G06F 9/542 455/418 |
| 2016/0018990 A1* | 1/2016 | Yun | G06F 3/0655 711/170 |
| 2016/0098334 A1* | 4/2016 | Hariharakrishnan | G06F 11/3466 702/186 |
| 2017/0024191 A1* | 1/2017 | Esliger | G06F 8/71 |
| 2018/0011771 A1* | 1/2018 | Schimmelpfeng | G06F 8/65 |
| 2018/0027407 A1* | 1/2018 | Veneroso | H04W 8/183 455/418 |
| 2018/0295501 A1* | 10/2018 | Veneroso | H04B 1/3816 |
| 2019/0325554 A1* | 10/2019 | Kelly | H04N 13/351 |
| 2019/0334771 A1* | 10/2019 | Milojicic | G06F 11/3051 |
| 2021/0076212 A1* | 3/2021 | Manikantan Shila | H04W 12/065 |
| 2021/0294656 A1* | 9/2021 | Tomic | G06F 11/3414 |
| 2022/0066829 A1* | 3/2022 | Pavagada Visweswara | G06F 9/5038 |
| 2022/0214912 A1* | 7/2022 | Julien | G06F 9/5072 |

\* cited by examiner

MANAGEMENT OF A COMPUTING DEVICE USAGE PROFILE

TECHNICAL FIELD

The present disclosure relates generally to semiconductor memory and methods, and more particularly, to apparatuses, systems, and methods corresponding to management of a computing device usage profile.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
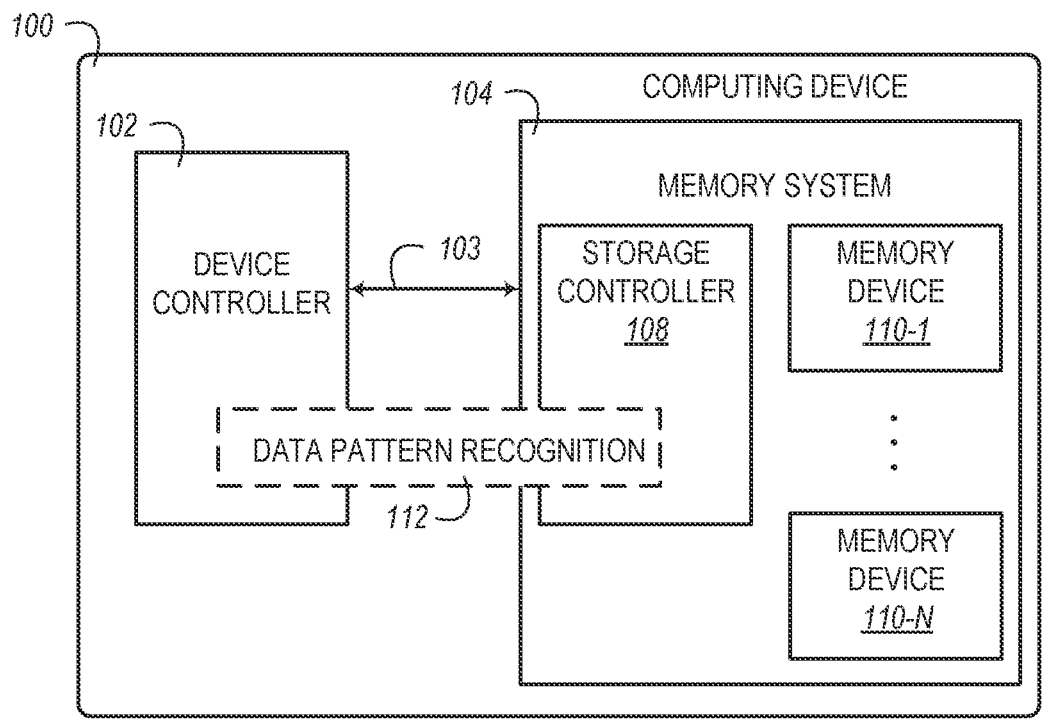
FIG. 1 is a functional block diagram in the form of a computing device including an apparatus including a device controller and a memory system in accordance with a number of embodiments of the present disclosure.

Methods, systems, and apparatuses related to management of a computing device usage profile are described. The usage profile can be a usage profile of a computing device. Characteristics of workloads executed by a computing device can be monitored to determine whether performance of the computing device can be optimized by execution of an updated usage profile. Responsive to a determination that the performance of the computing device can be improved by execution of an updated usage profile, the updated usage profile can be received by the computing device and executed thereon.

As broadband cellular network technology evolves, higher resource demands may be placed on devices connected to a broadband cellular network. This can be due to increases in available bandwidth associated with broadband cellular networks (referred to herein for brevity as "networks"), which can, in turn, give rise to higher download speeds and therefore increased data traffic associated with devices connected to the network. Such increased data traffic can further give rise a greater quantity of data received, stored, and/or processed within devices connected to the network.

In addition, the potential for increased data traffic involving devices, such as mobile computing devices, connected to the network can allow for increasingly complicated applications (e.g., computing applications that are designed to cause a computing device to perform one or more specific functions or tasks) to be executed on the devices. Execution of such applications can in turn give rise to demanding workloads, which can strain computing resources and, more specifically, strain computing resources that are allocated to such devices in some conventional approaches.

As used herein, the term "application" generally refers to one or more computer programs that can include computing instructions that are executable to cause a computing system to perform certain tasks, functions, and/or activities. An amount of computing resources (e.g., processing resources and/or memory resources) consumed in execution of an application can be measured in terms of a "workload." As used herein, the term "workload" generally refers to the aggregate computing resources consumed in execution of applications that perform a certain task, function, and/or activity. During the course of executing an application, multiple sub-applications, sub-routines, etc. may be executed by the computing system. The amount of computing resources consumed in executing the application (including the sub-applications, sub-routines, etc.) can be referred to as the workload.

As workloads become increasingly demanding, especially in light of improvements to broadband cellular network technology and improvements to processing and/or memory resources available to process workloads, issues associated with optimization of workload handling can become further exacerbated in mobile computing devices (e.g., smartphones, tablets, phablets, and/or Internet-of-Things (IoT) devices, among others) where physical space constraints can dictate the amount of processing resources and/or memory resources available to the device. In addition, execution of demanding workloads using mobile computing devices can, in some approaches, quickly drain battery resources available to the mobile computing device and/or cause unwanted thermal behavior (e.g., the mobile computing device can become too hot to operate in a stable manner, etc.) for the mobile computing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to IoT devices, among other types of edge computing devices.

At least for the foregoing reasons, optimization of instructions (e.g., instructions executable to perform media management operations, firmware instructions, etc.) necessary to operation of a mobile computing device can become difficult due to the dynamic nature of mobile computing device usage, which can include evolving workload demands and/or the execution of new workloads. It is therefore an objective of the present disclosure to optimize such instructions to improve the overall functioning of a computing device (e.g., a mobile computing device).

For example, as described herein, performance of a mobile computing device may be optimized based on workloads that are executed by the mobile computing device and/or workloads that are predicted to be executed by the mobile computing device. As used herein, the term "optimized" generally refers to a condition in which computing resources (e.g., processing and/or memory resources) of the mobile computing device are allocated in a way that makes the best (or nearly the best) use of the computing resources for a particular purpose (e.g., for execution of particular types of workloads and/or for particular types of determined user behavior with respect to the mobile computing device. In some embodiments, a usage profile (or "user profile") can associated with the mobile computing device. As used herein, a "usage profile" and variants thereof, generally refers to a directory of stored usage settings and information for a related user account or computing device. For example, a usage profile may include settings for applications and/or programs that are installed on a mobile computing device, operating system information corresponding to the mobile computing device, and/or media management profile information corresponding to a mobile computing device, among others. Some non-limiting examples of media management profile information include information corresponding to power consumption of the mobile computing device, wear to components of the mobile computing device due, for example to memory access operations being performed involving memory devices of the mobile computing device, an expected use life and/or expected lifetime of the mobile computing device, and/or workload characteristics of the mobile computing device, among others.

In some embodiments, the usage profile can be selected from a number of predefined usage profiles that may be stored within a memory device resident on the mobile computing device. As used herein, the term "resident on" refers to something that is physically located on a particular component. For example, the memory device being "resident on" the mobile computing device refers to a condition in which the memory device is physically coupled to, or physically within, the mobile computing device. The term "resident on" may be used interchangeably with other terms such as "deployed on" or "located on," herein.

Embodiments are not so limited, however, and in some embodiments, the usage profile can be stored in a distributed computing system (e.g., a software defined data center, cloud-based computing environment, telecommunications network, such as a 4G or 5G network, etc.) and can be written to the mobile computing device based on determined characteristics of the mobile computing device, such as characteristics of workloads executed by the mobile computing device. In embodiments in which the usage profile is stored in a distributed computing system, the usage profile can represent an aggregate of one or more usage profiles that are executed on mobile computing devices that are communicatively coupled to the distributed computing system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 100 may reference element "00" in FIG. 1, and a similar element may be referenced as 300 in FIG. 3. A group or plurality of similar elements or components may generally be referred to herein with a single element number. For example, a plurality of reference elements 110-1 to 110-N (or, in the alternative, 110-1, . . . , 110-N) may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing device 100 including an apparatus including a device controller 102 and a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a number of different memory devices 110-1 to 110-N, which include one or more memory modules (e.g., single in-line memory modules, dual in-line memory modules, etc.). In some embodiments, the computing device 100 can be a mobile computing device, such as a personal laptop computer, a digital camera, a smart phone, a memory card reader, and/or an internet-of-things (IoT) enabled device, as described herein.

The computing device 100 can include a system motherboard and/or backplane and can include and can include a memory access device, e.g., a processor (or processing unit), as described below. The system 100 can include separate integrated circuits or one or more of the device controller 102, the memory system 104, the storage controller 108, and/or the memory devices 110-1 to 110-N can be on the same integrated circuit. Although the example shown in FIG. 1 illustrates a computing device 100 having a Von Neumann architecture, embodiments of the present disclosure can be implemented in non-Von Neumann architectures, which may not include one or more components (e.g., CPU, ALU, etc.) often associated with a Von Neumann architecture.

The memory system 104 can include volatile memory and/or non-volatile memory. In a number of embodiments, memory system 104 can include a multi-chip device. A multi-chip device can include a number of different memory devices 110-1 to 110-N, which can include a number of different memory types and/or memory modules. For example, a memory system 104 can include non-volatile or volatile memory on any type of a module. In addition, as shown in FIG. 1, the memory system 104 can include a storage controller 108. Each of the components (e.g., the device controller 102, the memory system 104, the storage controller 108, and/or the memory devices 110-1 to 110-N can be separately referred to herein as an "apparatus." The storage controller 108 may be referred to as a "processing device" or "processing unit" herein.

The memory system 104 can provide main memory for the computing system 100 or could be used as additional memory and/or storage throughout the computing system 100. The memory system 104 can include one or more memory devices 110-1 to 110-N, which can include volatile and/or non-volatile memory cells. At least one of the memory devices 110-1 to 110-N can be a flash array with a NAND architecture, for example. Embodiments are not limited to a particular type of memory device. For instance, the memory system 104 can include RAM, ROM, DRAM, SDRAM, PCRAM, RRAM, and flash memory, among others.

In embodiments in which the memory system 104 includes non-volatile memory, the memory system 104 can include any number of memory devices 110-1 to 110-N that can include flash memory devices such as NAND or NOR flash memory devices. Embodiments are not so limited, however, and the memory system 104 can include other non-volatile memory devices 110-1 to 110-N such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In some embodiments, the memory devices 110-1 to 110-N include different types of memory. For example, the memory device 110-1 can be a non-volatile memory device, such as a NAND memory device, and the memory device 110-N can be a volatile memory device, such as a DRAM device, or vice versa. Embodiments are not so limited, however, and the memory devices 110-1 to 110-N can include any type and/or combination of memory devices.

The memory system 104 can further include a storage controller 108. The storage controller 108 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the storage controller 108 can comprise one or more processors (e.g., processing device(s), processing unit(s), etc.).

In some embodiments, the storage controller 108 can control access to the memory devices 110-1 to 110-N. For example, the storage controller 108 can process signaling corresponding to memory access requests (e.g., read and write requests involving the memory devices 110-1 to 110-N) and cause data to be written to and/or read from the memory devices 110-1 to 110-N.

In addition, the storage controller 108 can process signaling corresponding to workloads and usage profiles associated with the computing device 100. For example, the storage controller 108 can monitor characteristics of workloads executed by the computing device 100 to determine if the current usage profile is an optimized usage profile for the computing device 100. If the storage controller 108 determines that the usage profile is not optimized based on the workloads executed by the computing device 100, the storage controller 108 can select a different usage profile and cause the different usage profile to be executed by the computing device 108. In some embodiments, the different usage profile can be selected from a set of predefined usage profiles stored in the memory devices 110-1 to 110-N. Embodiments are not so limited, however, and in some embodiments, the storage controller 108 can retrieve a different usage profile from circuitry external to the computing device 100, as described below. In addition to, or in the alternative, the storage controller 108 can cause updated operational instructions (e.g., firmware updates) to be retrieved from circuitry external to the computing device 100 and executed by the computing device 100 to optimize performance of the computing device 100 based on the characteristics of the workloads executed by the computing device.

As discussed in more detail in connection with FIG. 2, herein, the storage controller 108 can communicate with circuitry external to the computing device 100 as part of performing the operations described herein. For example, the storage controller can transfer and receive signaling from a distributed computing system, such as the distributed computing system 318 illustrated in FIG. 2. In some embodiments, the signaling transferred and received by the storage controller 108 can include commands corresponding to usage profiles and/or other instructions that can be executed by the storage controller 108 to optimize a usage profile of the computing device 100 based on workloads executed by the storage controller 108 and/or the device controller 102.

In some embodiments, the storage controller 108 and/or the device controller 102 can execute instructions corresponding to data pattern recognition 112. For example, the storage controller 108 and/or the device controller 102 can execute instructions that can cause the computing device 100 to monitor data (e.g., workloads, executed applications, types of applications executed, etc.) processed by the computing device 100 to determine patterns associated with such data. In some embodiments, the data pattern recognition 112 information can be used by the storage controller 108 and/or the device controller 102 to predict and/or determine likely future data processing trends of the computing device 100. The storage controller 108 and/or the device controller 102 can then use the predicted data processing trends to optimize the usage profile and/or operational instructions (e.g., firmware instructions) preemptively and/or dynamically.

As illustrated in FIG. 1, a device controller 102 (which may be referred to herein as a "controller" for brevity) can be coupled to the memory system 104. In a number of embodiments, the memory system 104 can be coupled to the device controller 102 via one or more channels (e.g., channel 103). As used herein, a "channel" generally refers to a communication path by which signaling, commands, data, instructions, and the like are transferred between the device controller 102, the memory system 104, the storage controller 108, and/or the memory devices 110-1 to 110-N. Although not shown in FIG. 1 so as to not obfuscate the drawings, the memory devices 110-1 to 110-N can be coupled to the storage controller 108 and/or to the device controller 102 via one or more channels such that each of the memory devices 110-1 to 110-N can receive messages, commands, requests, protocols, data, or other signaling that is compliant with the type of memory associated with each of the memory devices 110-1 to 110-N.

The device controller 102 can include circuitry to store and execute a host operating system to operate the computing device 100. For example, the device controller 102 can include a memory access device, e.g., a processor (or processing unit) that can execute operating system instructions to cause the computing device 100 to perform one or more tasks and/or functions. One of ordinary skill in the art will appreciate that "a processor" can intend one or more processors, such as a parallel processing system, a number of coprocessors, etc.

In a non-limiting example, an apparatus (e.g., the computing device 100) includes a processing unit (e.g., the storage controller 108) and a memory device 110. As described herein, in some embodiments, the apparatus can be a mobile computing device. The processing unit can determine a usage profile for the apparatus based, at least in part, on characteristics of workloads executed by the processing unit and write instructions corresponding to an operational mode (e.g., an optimized operational mode) of the apparatus to the memory device 110. In some embodiments, the instructions corresponding to the operational mode of the apparatus can be based, at least in part, on the characteristics of the workloads executed by the processing unit. The processing unit can monitor characteristics of workloads executed by the processing unit subsequent to execution of the instructions corresponding to the optimized operational mode of the apparatus and update the usage profile, the instructions corresponding to the optimized operational mode of the apparatus, or both, based on the monitored characteristics of the workloads executed by the processing unit subsequent to execution of the instructions corresponding to the optimized operational mode of the apparatus. In some embodiments, the processing unit can update the usage profile to one of a selectable number of usage profiles (e.g., the usage profiles 216 illustrated in FIG. 2, herein) stored in the memory device 110. Embodiments are not so limited, however, and in some embodiments, the processing unit can update the usage profile to one of a selectable number of usage profiles stored in a distributed computing system (e.g., the distributed computing system 318 illustrated in FIG. 3, herein) communicatively coupled to the apparatus.

Continuing with this example, the processing unit can perform operations to predict, based at least in part on the workloads executed by the processing unit subsequent to execution of the instructions corresponding to the optimized operational mode of the apparatus, or a determined aggregate usage profile accessible to the apparatus, or both, whether a change is to be made to the usage profile.

As described in more detail in connection with FIG. 2, herein, in some embodiments, the processing unit can allocate a first portion of the memory device (e.g., the first portion 214-1 illustrated in FIG. 2, herein) for use during operation of the apparatus when the apparatus is operating according to the usage profile and responsive to an update of the usage profile, allocate a second portion (e.g., the second portion 214-M illustrated in FIG. 2, herein) of the memory device in addition to the first portion of the memory device for use during operation of the apparatus when the apparatus is operating according to the updated usage profile.

In some embodiments, the processing unit can allocate a first portion of the memory device for use during operation of the apparatus when the apparatus is operating according to the usage profile, receive an instruction to open a second portion of the memory device for use during operation of the apparatus, and allocate the second portion of the memory device for use during operation of the apparatus in response to execution of the received instruction.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory system 104 and/or the memory devices 110-1 to 110-N. It will be appreciated by those skilled in the art that the number of address input connections can depend on the density and architecture of the memory system 104 and/or the memory devices 110-1 to 110-N.

Figure 2:
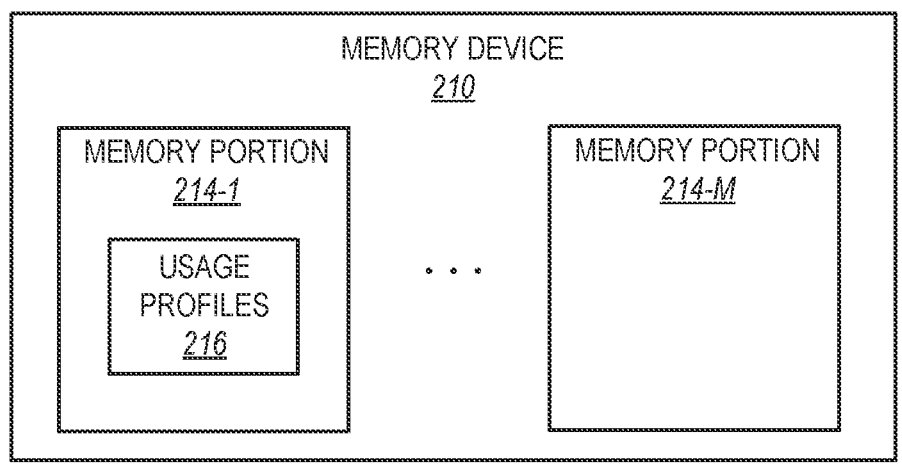
FIG. 2 is a block diagram in the form of memory device including multiple memory portions in accordance with a number of embodiments of the present disclosure.

FIG. 2 is a block diagram in the form of memory device 210 including multiple memory portions 214-1 to 214-M in accordance with a number of embodiments of the present disclosure. As shown in FIG. 2, the memory device 210 can include a number of memory portions 214-1 to 214-M, which can include one or more usage profiles 216. The memory device 210 can be analogous to the memory device(s) 110 illustrated in FIG. 1, herein.

The number of memory portions 214-1 to 214-M can correspond to particular physical memory locations within the memory device 210. For example, the number of memory portions 214-1 to 214-M can correspond to a particular quantity of memory cells, memory arrays, memory dice, and the like. In some embodiments, at least one of the memory portions (e.g., the memory portion 214-M) can be locked such that the memory device 210 is unable to access the memory cells associated with the locked memory portion.

However, in response to commands or signaling initiated by the computing device (or a user of the computing device) in which the memory device 210 is operating, one or more of the locked memory portions can be unlocked such that the memory device 210 can perform memory accesses involving the memory cells in the previously locked memory portion. In some embodiments, the commands or signaling to unlock a locked memory portion can be initiated in response to an update of the usage profile and/or an update to instructions to optimize performance of the computing device in which the memory device 210 is operating. Embodiments are not so limited, however, and in some embodiments, the commands or signaling to unlock a locked memory portion can be initiated in response to a user command and/or upon transfer of monetary compensation from the user to an operator of the computing device, distributed computing architecture, or other service provider. That is, in some embodiments, the locked memory portion can be unlocked in response to a storage-as-a-service transaction.

Figure 3:
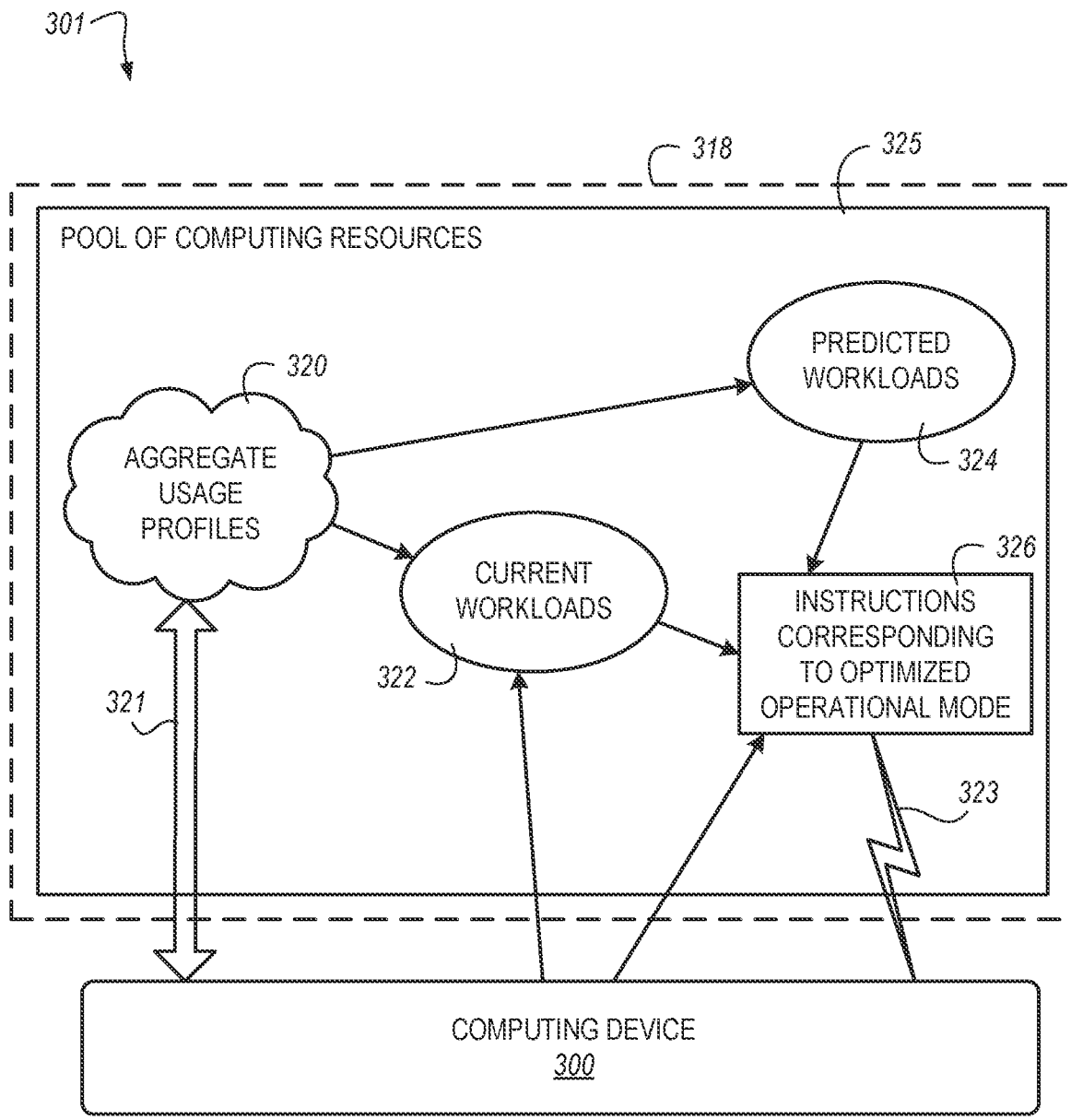
FIG. 3 is a block diagram in the form of a computing system 301 in accordance with a number of embodiments of the present disclosure.

The usage profiles 216 can be written to the memory device 210 during manufacture of the memory device 210 (e.g., predetermined usage profiles) and/or can be updated (e.g., can be retrieved from a pool of computing resources 325 available to the distributed computing system 318 illustrated in FIG. 3, herein) during the course of the life of the memory device 210 in response to operations described herein. In some embodiments, at least one of the usage profiles 216 is an active usage profile that includes instructions (e.g., firmware, software, microcode, or other computer readable instructions) being executed by a computing system (e.g., the computing system 100 illustrated in FIG. 1) in which the memory device 210 is operating.

FIG. 3 is a block diagram in the form of a computing system 301 in accordance with a number of embodiments of the present disclosure. The computing system 301 can include a distributed computing system 318 and a computing device 300. In some embodiments, the computing device 300 is analogous to the computing device 100 illustrated in FIG. 1.

In some embodiments, the distributed computing system 318 may include a pool of shared computing resources 325 (e.g., processing resources and memory resources). As used herein, a "distributed computing system" generally refers to a collection of computing systems in which one or more hosts (e.g., host computing systems) are configured to provide computing functionality via a network such as the Internet. Examples of distributed computing systems can include software defined data centers, multi-user networks, and cloud computing environments, among others.

The computing resources 325 of the distributed computing system 318 can perform various operations to process and/or store data corresponding to aggregate usage profiles 320, current workloads 322 (e.g., workloads that are being executed by the computing device 300), predicted workloads 324 (e.g., workloads that are predicted to be executed in the future by the computing device 300 based on the data pattern recognition 112 described in connection with FIG. 1, herein), and instructions corresponding to an operational mode 326 of the computing device 300. In some embodiments, the operational mode 326 can be an optimized operational mode, as described herein.

The aggregate usage profiles 320 can be collected from a set of computing devices to which the computing device 300 belongs. For example, the distributed computing system 318 can be in communication with multiple computing devices, such as the computing device 300, and can be configured to retrieve, via the communication path 221, for example, information corresponding to the usage data of the set of computing devices that are in communication with the distributed computing system 318. The communication path can, in some embodiments, be a wireless communication path (e.g., an "over-the-air" communication path), such as a wireless Internet connection and/or cellular network connection. The distributed computing system 322 can then process, analyze, and/or store the information corresponding to the usage data of the set of computing devices that are in communication with the distributed computing system 318 as part of the aggregate usage profiles 320.

In some embodiments, the aggregate usage profiles 320 can be processed and/or analyzed in connection with monitoring current workloads 322 and/or future workloads 324 for the computing device 300 and/or other computing devices in the set of computing devices. For example, the aggregate workloads 320 can be analyzed to determine similarities and/or differences between characteristics of workloads executed by the computing device 300, as well as the characteristics of workloads executed by other computing devices in the set of computing devices that are in communication with the distributed computing system 318. In some embodiments, information corresponding to the determined similarities and/or difference between the characteristics of workloads executed by the computing device 300, as well as the characteristics of workloads executed by other computing devices in the set of computing devices that are in communication with the distributed computing system 318 can be used by the computing system 300 to determine an optimized usage profile for the computing device 300.

The current workloads 322 can correspond to workloads that are being executed by the computing device 300. In some embodiments, the current workloads can be monitored by the computing device 300 (e.g., the device controller 102 and/or the storage controller 108 illustrated in FIG. 1, herein) and/or can be monitored by computing resources 325 available to the distributed computing system 318 to determine characteristics associated with execution of the workloads. In some embodiments, the characteristics associated with execution of the workloads can include types of applications (e.g., camera/video applications, gaming applications, financial applications, social media applications, health applications, etc.) executed by the computing deice 300, power consumption (e.g., battery consumption) associated with execution of the workload(s), and/or frequency of execution of the workload(s), among others.

In some embodiments, the computing device 300 (e.g., the device controller 102 and/or the storage controller 108 illustrated in FIG. 1, herein) and/or computing resources 325 available to the distributed computing system 318 can determine if the usage profile utilized by the computing device 300 is optimized by comparing the characteristics of the workloads (e.g., the current workloads 322) executed by the computing device 300 to the aggregate usage profiles 320 to determine if the computing device 300 can be optimized by updating the usage profile associated therewith and/or by updating the instructions corresponding to the optimized operational mode 326.

If it is determined that performance of the computing device 300 can be optimized by updating the usage profile associated therewith and/or by updating the instructions corresponding to the optimized operational mode 326, the computing device 300 and/or the distributed computing system 318 can cause an updated usage profile and/or updated instructions corresponding to the optimized operational mode 326 to be transferred to the computing device 300 and executed by the computing device 300. In some embodiments, the updated usage profile and/or updated instructions corresponding to the optimized operational mode 326 can be transferred to the computing device 300 as part of an over-the-air programming operations, as indicated at reference numeral 323.

The predicted workloads 324 can correspond to workloads that are predicted to be executed by the computing device 300. In some embodiments, the prediction as to whether one or more workloads are going to be executed in the future can be made, at least partially, using the data pattern recognition 112 techniques described above in connection with FIG. 1. That is, in some embodiments, the device controller 102 and/or the storage controller 108 illustrated in FIG. 1 can monitor and analyze workload execution over time for the computing device 300 and predict future workloads that may be subsequently executed by the computing device 300. Embodiments are not so limited, however, and in some embodiments, the computing resources 325 available to the distributed computing system 318 can monitor and analyze workload execution over time for the computing device 300 and predict future workloads that may be subsequently executed by the computing device 300 either in connection with the device controller and/or the storage controller or in the absence of signaling from the device controller and/or the storage controller.

The instructions corresponding to the optimized operational mode 326 of the computing device 300 can include one or more sets of instructions that, when executed by the computing device 300, can provide low-level control of hardware associated with the computing device 300. In some embodiments, the instructions corresponding to the optimized operational mode 326 can include firmware or other executable instructions that provide low-level control of hardware associated with the computing device 300.

If, as described above, it is determined that performance of the computing device 300 can be optimized by updating the instructions corresponding to the optimized operational mode 326, the computing device 300 and/or the distributed computing system 318 can cause updated instructions corresponding to the optimized operational mode 326 to be transferred to the computing device 300 and executed by the computing device 300. In some embodiments, the updated instructions corresponding to the optimized operational mode 326 can be transferred to the computing device 300 as part of an over-the-air programming operation, as indicated at reference numeral 323.

In a non-limiting example, a system (e.g., the computing system 301) can include a distributed computing system 318 that includes a pool of shared computing resources 325 (e.g., processing resources and/or memory resources). A mobile computing device (e.g., the computing device 300) can be communicatively coupled to the distributed computing system 318. As described above, the mobile computing device can include a processing unit (e.g., the storage controller 108 illustrated in FIG. 1, herein) and a memory device (e.g., the memory device(s) 110-1 to 110-N illustrated in FIG. 1, herein). Continuing with this example, the processing unit can execute one or more workloads and determine a usage profile (e.g., the usage profiles 216 illustrated in FIG. 2, herein) for the apparatus based, at least in part, on characteristics of the executed workloads.

The processing unit can further write instructions corresponding to an operational mode (e.g., an optimized operational mode) of the apparatus to the memory device. In some embodiments, the instructions correspond to the optimized operational mode of the mobile computing device and are based, at least in part, on the characteristics of the executed workloads. In some embodiments, the instructions corresponding to the operational mode of the mobile computing device can include instructions corresponding to at least one of an optimized battery life, an optimized mobile computing device reliability, an optimized device life of the mobile computing device, and/or an optimized performance of the mobile computing device, among others.

Continuing with this example, the processing unit can monitor characteristics of one or more workloads executed subsequent to execution of the instructions corresponding to the optimized operational mode of the apparatus and predict changes to the usage profile using the characteristics of the executed workloads or the characteristics of the workloads executed subsequent to execution of the instructions corresponding to the operational mode of the mobile computing device, or both.

The processing unit can update at least one of the usage profile or the instructions corresponding to the operational mode of the apparatus, or both, based on the predicted changes of the one or more workloads executed by the processing unit subsequent to execution of the instructions corresponding to the operational mode of the apparatus. In some embodiments, the processing unit can, as part of updating at least the one of the usage profile or the instructions corresponding to the operational mode of the apparatus, or both, update a set of firmware instructions written to the memory device of the mobile computing device.

As described above, in some embodiments, the processing unit can update the usage profile to one of a selectable number of usage profiles stored in the memory device. Embodiments are not so limited, however, and in some embodiments, the processing unit can update the usage profile to one of a selectable number of usage profiles (e.g., the aggregate usage profiles 320 and/or the instructions corresponding to the operational mode 326 illustrated in FIG. 3, herein) stored in the pool of computing resources 325 of the distributed computing system 318.

As described above in connection with FIG. 2, in some embodiments, the processing unit can allocate a first portion (e.g., the memory portion 214-1 illustrated in FIG. 2, herein) of the memory device for use during operation of the mobile computing device. The processing unit can subsequently transfer a command to the distributed computing system 318 to request allocation of a second portion (e.g., the memory portion 214-M illustrated in FIG. 2, herein) of the memory device for use during operation of the mobile computing device. The processing unit can receive an instruction to open the second portion of the memory device for use during operation of the mobile computing device and allocate the second portion of the memory device for use during operation of the mobile computing device in response to execution of the received instruction. In some embodiments, the processing unit can allocate the second portion of the memory device such that both the first portion of the memory device and the second portion of the memory device can be accessed during runtime of the mobile computing device.

In some embodiments, the processing unit can monitor user interaction with the mobile computing device to determine user priorities associated with the mobile computing device and update at least the one of the usage profile or the instructions corresponding to the operational mode of the apparatus, or both, based on the monitored user priorities associated with the mobile computing device. Non-limiting examples of user priorities can include types of applications the user typically executes, types of peripheral devices the user typically uses, security concerns, reliability concerns, reliability vs. performance, battery life vs. performance, and/or device life vs. performance.

Embodiments are not so limited, and in some embodiments, the processing unit can receive input (e.g., a user input) corresponding to user priorities associated with the mobile computing device and update at least the one of the usage profile or the instructions corresponding to the operational mode (e.g., the optimized operational mode) of the apparatus, or both, based on the user priorities associated with the mobile computing device.

Figure 4:
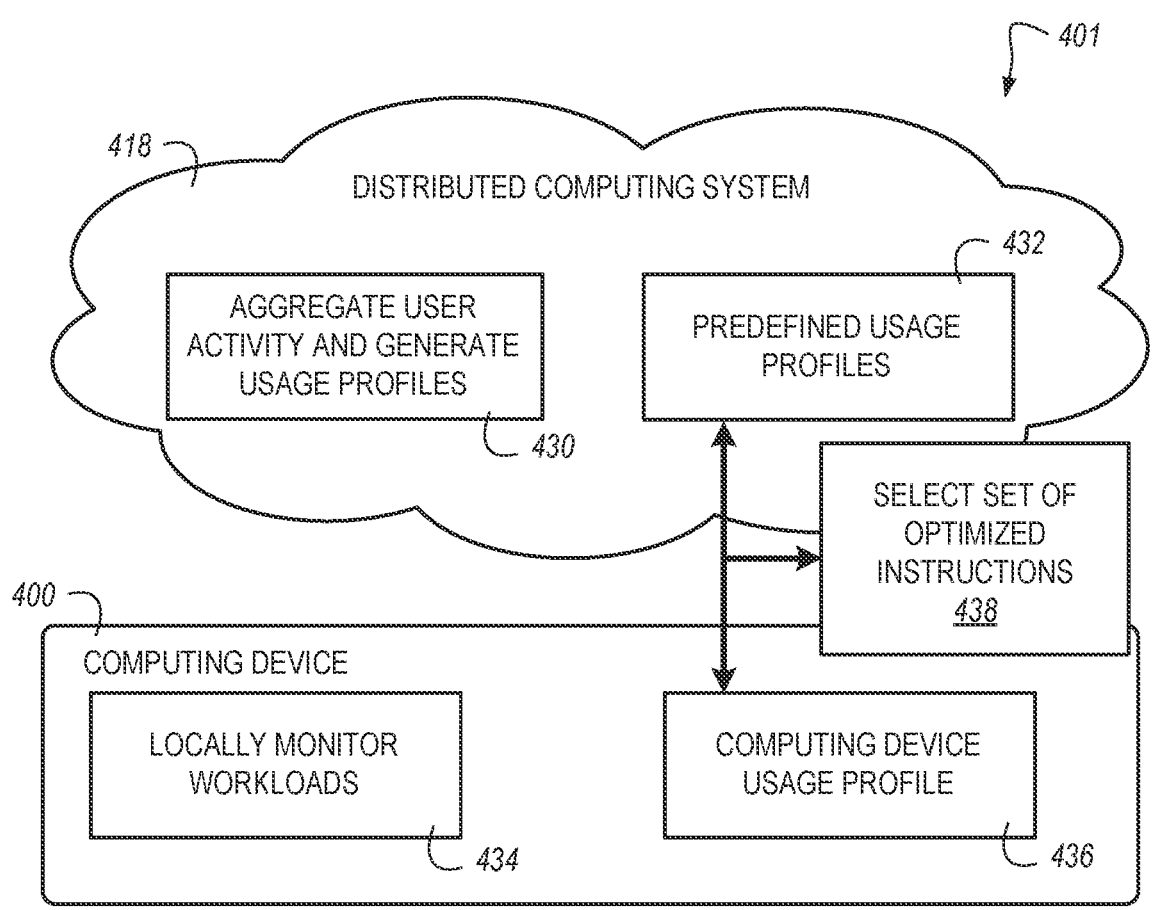
FIG. 4 is another block diagram in the form of a computing system in accordance with a number of embodiments of the present disclosure.

FIG. 4 is another block diagram in the form of a computing system 401 in accordance with a number of embodiments of the present disclosure. The computing system 401 can include a distributed computing system 418 and a computing device 400. In some embodiments, the computing device 400 is analogous to the computing device 100 illustrated in FIG. 1 and/or the computing device 300 illustrated in FIG. 3. Although not explicitly shown, the distributed computing system 418 can include a pool of computing resources, such as the pool of computing resources 325 illustrated in FIG. 3. In addition, the computing device 400 can include a device controller and a memory system, which can include a storage controller and memory devices, as shown in FIG. 1.

In some embodiments, the computing resources of the distributed computing system 418 can, at block 430, aggregate user activity and generate usage profiles based on the aggregated user activity. The user activity can correspond to user behavior with respect to one or more mobile computing devices and can include information corresponding to characteristics of workloads executed by the computing device 400 and/or other computing device in communication with the distributed computing system 418.

The computing resources of the distributed computing system 418 can, at block 432, include one or more predefined usage profiles. The predefined usage profiles can be transferred to the computing device 400 as described herein. In some embodiments, the predefined usage profiles can include one or more sets of instructions (e.g., firmware, etc.) that are optimized for certain computing device 400 workloads. For example, one or more of the predefined usage profiles can include instructions that are optimized for a computing device 400 that is used primarily for viewing social media sites while another one or more of the predefined usage profiles can include instructions that are optimized for a computing device 400 that is primarily used for capturing images and/or video. Embodiments are not so limited, however, and the instructions corresponding to the predefined usage profiles can include instructions that are optimized for battery performance, maximization of memory device life, and/or optimization of speed of application execution, among others.

As described above, the computing device 400 can, for example, at block 434, monitor workloads executed by the computing device 400. The computing device 400 can perform data pattern recognition operations (as described in connection with FIG. 1, herein) as part of monitoring the workloads executed by the computing device 400. The data pattern recognition operations can be used by the computing device 400 to predict future behavior of the computing device 400 and/or to retrieve and execute usage profiles and/or operational instructions that are optimized for the predicted future use of the computing device 400.

In some embodiments, the computing device 400 can store and execute a computing device usage profile 436. As described in more detail, herein, the usage profile can be an initial usage profile, and updated (optimized) usage profile, and/or one or more predefined usage profiles that can be written to the computing device 400 either at manufacture or during runtime of the computing device 400.

In some embodiments, in order to determine the optimized usage profile for the computing device 400, a comparison can be made between the predefined usage profiles 432 and the computing device usage profile 436. Based on the comparison, at block 438, a set of optimized operational instructions can be selected for the computing device 400 and executed thereby.

Figure 5:
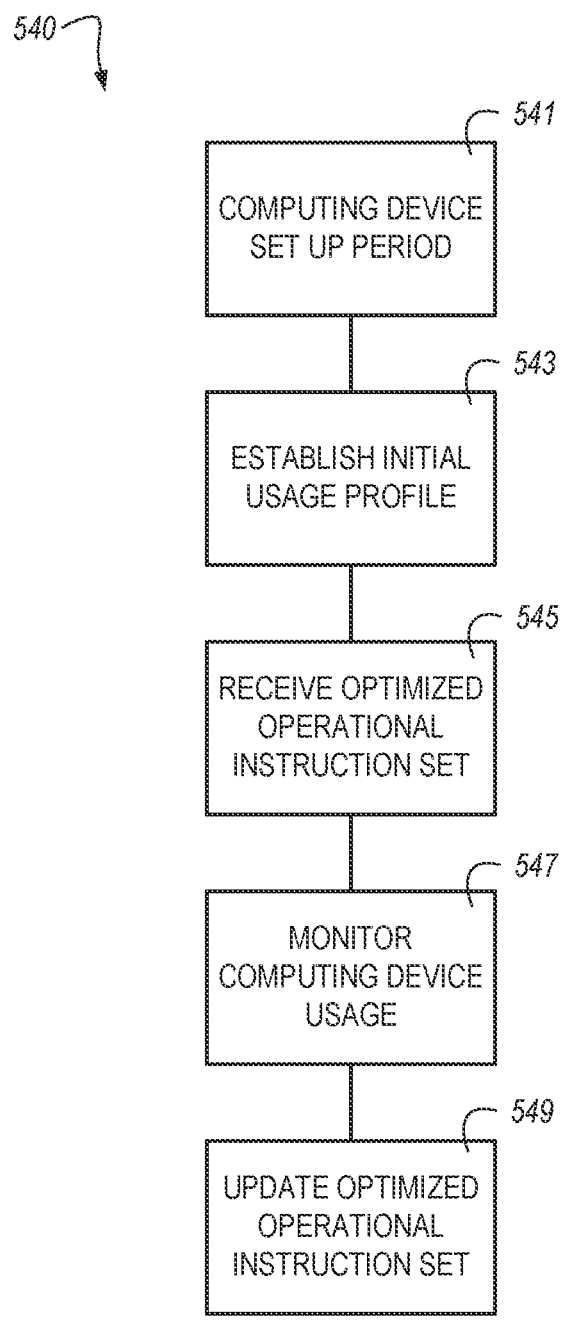
FIG. 5 is a flow diagram corresponding to management of a computing device usage profile in accordance with a number of embodiments of the present disclosure.

FIG. 5 is a flow diagram 540 corresponding to management of a computing device usage profile in accordance with a number of embodiments of the present disclosure. The flow 540 can be performed by processing logic that can include hardware (e.g., processing unit(s), control circuitry, dedicated logic, programmable logic, microcode, hardware of a device, and/or integrated circuit(s), etc.), software (e.g., instructions run or executed on a processing device), or a combination thereof. In some embodiments, the flow 540 is performed by a processing unit (e.g., the storage controller 108 illustrated in FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 541, a computing device setup period can occur. In some embodiments, the computing device may be analogous to the computing devices 100/300/400 illustrated in FIGS. 1, 3, and 4, herein. The computing device set up period can last from approximately hours to a number of days (e.g., one or two weeks).

During the computing device setup period, a user of the computing device (e.g., a mobile computing device) may experiment with features, applications, and/or components of the computing device. As the user experiments with the features, applications, and/or components of the computing device, the behavior of the user with respect to the computing device may be monitored. For example, characteristics of workloads executed by the user, applications favored by the user, features favored by the user, and/or other information corresponding to the behavior of the user with respect to the computing device may be obtained, analyzed, and/or processed by the computing device (or circuitry external to the computing device, such as by the pool of computing resources 325 associated with the distributed computing system 318 illustrated in FIG. 3).

At operation 543, an initial usage profile for the computing device can be established. In some embodiments, operation 543 can be performed after the behavior of the user has stabilized with respect to the computing device (e.g., after the setup period has concluded). In a non-limiting example, the initial usage profile for the computing device can be established approximately one month after purchase of the computing device.

At operation 545, the computing device can receive an optimized instruction set. For example, as described above, the computing device can receive an optimized instruction set during an over-the-air programming operation and/or the computing device can execute an optimized instruction set stored in a memory device associated with the computing device. In some embodiments, the optimized instruction set can include one or more firmware updates. Further, in some embodiments, the optimized instruction set can be based on the determined behavior of the user with respect to the computing device.

At operation 547, the behavior of the computing device can be monitored. For example, workloads executed by the computing device can be monitored to determine if there are changes in the behavior of the user with respect to the computing device. If it is determined that the user has altered their behavior with respect to the computing device, it can be determined whether the computing device can be optimized (or re-optimized) by changing the usage profile and/or by updating the optimized operational instruction set to a different optimized operational instruction set.

If, at operation 547, it is determined that the computing device can be optimized (or re-optimized) due to changes in the behavior of the user with respect to the computing device, at operation 549 the usage profile and/or the optimized operational instruction set can be updated to a different usage profile and/or a different optimized operational instruction set.

Figure 6:
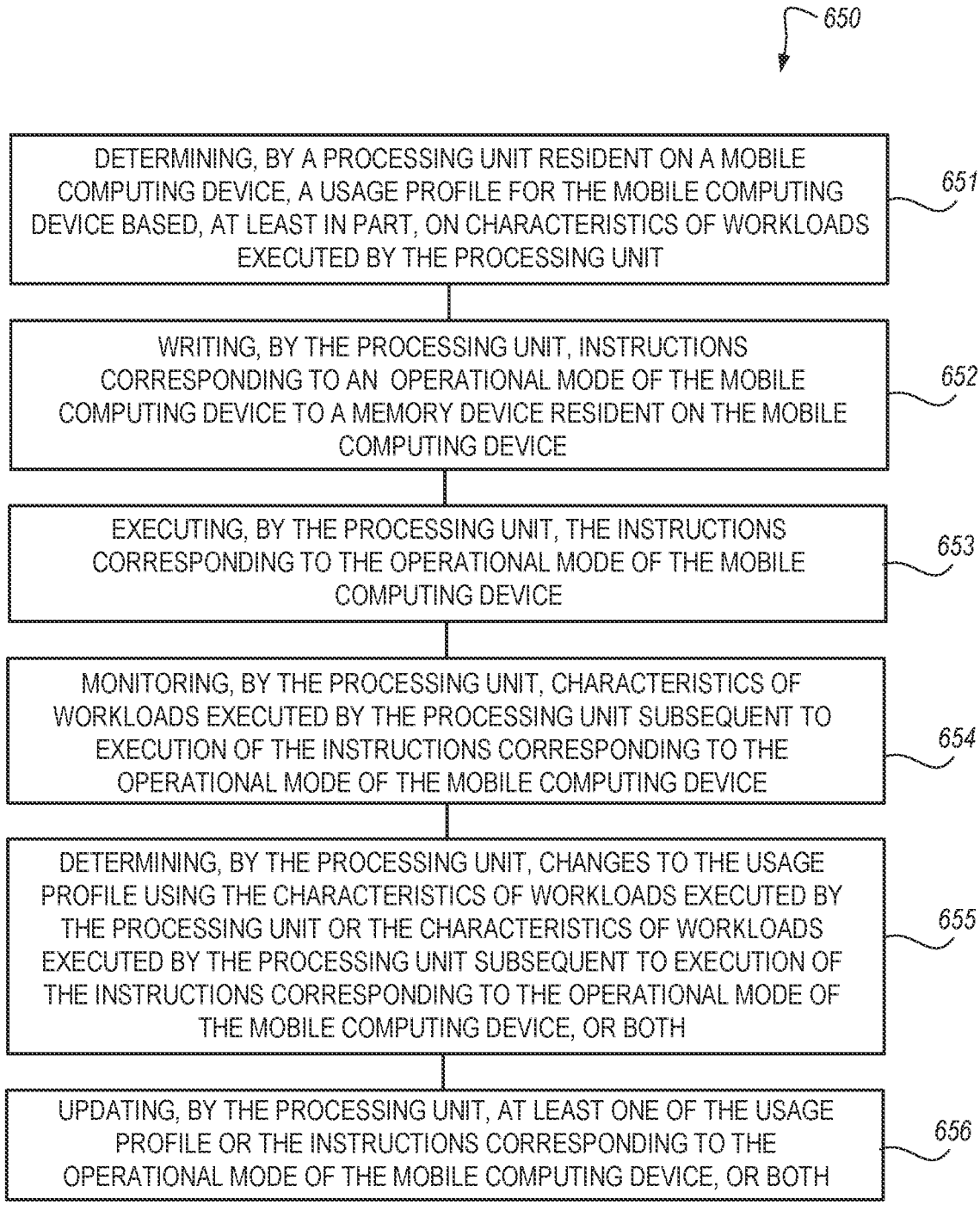
FIG. 6 is a flow diagram representing an example method corresponding to corresponding to management of a computing device usage profile in accordance with a number of embodiments of the present disclosure.

FIG. 6 is a flow diagram representing an example method 650 corresponding to corresponding to management of a computing device usage profile in accordance with a number of embodiments of the present disclosure. The method 650 can be performed by processing logic that can include hardware (e.g., processing unit(s), control circuitry, dedicated logic, programmable logic, microcode, hardware of a device, and/or integrated circuit(s), etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 651, the method 650 can include determining, by a processing unit resident on a mobile computing device, a usage profile for the mobile computing device based, at least in part, on characteristics of workloads executed by the processing unit. As described above, the processing unit can be analogous to the storage controller 108 illustrated in FIG. 1, herein. The mobile computing device can be analogous to the computing device 100/300/400 illustrated in FIGS. 1, 3, and 4, herein, and the usage profile can be analogous to the usage profiles 216 illustrated in FIG. 2, herein.

At block 652, the method 650 can include writing, by the processing unit, instructions corresponding to an operational mode (e.g., an optimized operational mode) of the mobile computing device to a memory device resident on the mobile computing device. In some embodiments, the instructions corresponding to the operational mode of the mobile computing device are based, at least in part, on the characteristics of the workloads executed by the processing unit.

At block 653, the method 650 can include executing, by the processing unit, the instructions corresponding to the operational mode of the mobile computing device. In some embodiments, execution of such instructions can include executing updated firmware instructions and/or an updated usage profile to alter at least one of a power consumption, an expected device lifetime, and/or an updated media management profile, etc.

At block 654, the method 650 can include monitoring, by the processing unit, characteristics of workloads executed by the processing unit subsequent to execution of the instructions corresponding to the operational mode of the mobile computing device. In some embodiments, the operational mode of the mobile computing device can be determined based, at least in part, on determined priorities of a user of the mobile computing device.

At block 655, the method 650 can include determining, by the processing unit, changes to the usage profile using the characteristics of workloads executed by the processing unit or the characteristics of workloads executed by the processing unit subsequent to execution of the instructions corresponding to the operational mode of the mobile computing device, or both. In some embodiments, the method 650 can include executing, by the processing unit, one or more machine learning instructions written to the memory device as part of determining and/or predicting changes to the usage profile using the characteristics of workloads executed by the processing unit or the characteristics of workloads executed by the processing unit subsequent to execution of the instructions corresponding to the operational mode of the mobile computing device, or both.

At block 656, the method 650 can include updating, by the processing unit, at least one of the usage profile or the instructions corresponding to the operational mode of the mobile computing device, or both. As described above, in some embodiments, the updated usage profile can be selected from a plurality of predetermined usage profiles written to the memory device of the mobile computing device. Embodiments are not so limited, however, and in some embodiments, the updated usage profile can be selected from a plurality of usage profiles determined for other mobile computing devices communicatively coupled to a network (e.g., the distributed computing system 318/418 illustrated in FIGS. 3 and 4, herein) accessible to the mobile computing device.

The method 650 can further include comparing, by the processing unit, the determined usage profile to an aggregated collection of usage profiles and writing, by the processing unit, the instructions corresponding to the operational mode of the mobile computing device based, at least in part, on the comparison of the determined usage profile to the aggregated collection of usage profiles.

The method 650 can include allocating a first portion allocate a first portion of the memory device for use during operation of the mobile computing device, receiving an instruction to open a second portion of the memory device for use during operation of the mobile computing device, and allocating, by the processing unit, the second portion of the memory device for use during operation of the mobile computing device in response to execution of the received instruction. As described above, these operations may be performed as part of a storage-as-a-service transaction.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory system; and
a processing unit coupled to the memory device, wherein the processing unit is to:
write, to the memory device, a predetermined usage profile;
determine a usage profile for the apparatus based, at least in part, on characteristics of workloads executed by the processing unit based on the predetermined usage profile;
compare the determined usage profile to an aggregated collection of usage profiles;
write instructions corresponding to an operational mode of the apparatus to the memory device, wherein the instructions corresponding to the operational mode of the apparatus are based, at least in part, on the characteristics of the workloads executed by the processing unit based on the predetermined usage profile and the comparison of the determined usage profile to the aggregated collection of usage profiles;
monitor characteristics of workloads executed by the processing unit subsequent to execution of the instructions corresponding to the operational mode of the apparatus; and
update at least one of the predetermined usage profile or the instructions corresponding to the operational mode of the apparatus, or both, based on the monitored characteristics of the workloads executed by the processing unit subsequent to execution of the instructions corresponding to the operational mode of the apparatus.

2. The apparatus of claim 1, wherein the apparatus comprises a mobile computing device.

3. The apparatus of claim 1, wherein the processing unit is to perform operations to predict, based at least in part on the workloads executed by the processing unit subsequent to execution of the instructions corresponding to the operational mode of the apparatus, or a determined aggregate usage profile accessible to the apparatus, or both, whether a change is to be made to the predetermined usage profile.

4. The apparatus of claim 1, wherein the processing unit is to:
allocate a first portion of the memory device for use during operation of the apparatus when the apparatus is operating according to the predetermined usage profile; and
responsive to an update of the predetermined usage profile, allocate a second portion of the memory device in addition to the first portion of the memory device for use during operation of the apparatus when the apparatus is operating according to the updated usage profile.

5. The apparatus of claim 1, wherein the processing unit is to:
allocate a first portion of the memory device for use during operation of the apparatus;
receive an instruction to open a second portion of the memory device for use during operation of the apparatus; and
allocate the second portion of the memory device for use during operation of the apparatus in response to execution of the received instruction.

6. The apparatus of claim 1, wherein the processing unit is to update the predetermined usage profile to one of a selectable number of usage profiles stored in the memory device.

7. The apparatus of claim 1, wherein the processing unit is to update the predetermined usage profile to one of a selectable number of usage profiles stored in a distributed computing system communicatively coupled to the apparatus.

8. A method, comprising:
writing, by a processing unit coupled to a memory device resident on a mobile computing device, a predetermined usage profile to the memory device;
determining, by the processing unit resident on the mobile computing device, a usage profile for the mobile computing device based, at least in part, on characteristics of workloads executed by the processing unit based on the predetermined usage profile;
comparing, by the processing unit, the determined usage profile to an aggregated collection of usage profiles;
writing, by the processing unit, instructions corresponding to an operational mode of the mobile computing device to the memory device resident on the mobile computing device, wherein the instructions corresponding to the operational mode of the mobile computing device are based, at least in part, on the characteristics of the workloads executed by the processing unit based on the predetermined usage profile and the comparison of the determined usage profile to the aggregated collection of usage profiles;
executing, by the processing unit, the instructions corresponding to the operational mode of the mobile computing device;
monitoring, by the processing unit, characteristics of workloads executed by the processing unit subsequent to execution of the instructions corresponding to the operational mode of the mobile computing device;
determining, by the processing unit, changes to the predetermined usage profile using the characteristics of workloads executed by the processing unit based on the predetermined usage profile or the characteristics of workloads executed by the processing unit subsequent to execution of the instructions corresponding to the operational mode of the mobile computing device, or both; and
updating, by the processing unit, at least one of the predetermined usage profile or the instructions corresponding to the operational mode of the mobile computing device, or both.

9. The method of claim 8, further comprising selecting the updated usage profile from a plurality of predetermined usage profiles written to the memory device of the mobile computing device.

10. The method of claim 8, further comprising selecting the updated usage profile from a plurality of usage profiles determined for other mobile computing devices communicatively coupled to a network accessible to the mobile computing device.

11. The method of claim 8, further comprising executing, by the processing unit, one or more machine learning instructions written to the memory device as part of predicting changes to the predetermined usage profile using the characteristics of workloads executed by the processing unit based on the predetermined usage profile or the characteristics of workloads executed by the processing unit subsequent to execution of the instructions corresponding to the operational mode of the mobile computing device, or both.

12. The method of claim 8, further comprising:
allocating a first portion allocate a first portion of the memory device for use during operation of the mobile computing device;
receiving an instruction to open a second portion of the memory device for use during operation of the mobile computing device; and
allocating, by the processing unit, the second portion of the memory device for use during operation of the mobile computing device in response to execution of the received instruction.

13. The method of claim 8, wherein the operational mode of the mobile computing device is determined based, at least in part, on determined priorities of a user of the mobile computing device.

14. A system, comprising:
a distributed computing system comprising a pool of shared computing resources; and
a plurality of mobile computing devices communicatively coupled to the distributed computing system wherein each mobile computing device of the plurality of mobile computing devices comprises a processing unit and a memory device, wherein the processing unit is to:
write, to the memory device, a predetermined usage profile;
execute one or more workloads based on the predetermined usage profile;
determine a usage profile for the mobile computing device based, at least in part, on characteristics of the executed workloads;
compare the determined usage profile to an aggregated collection of usage profiles of the plurality of mobile computing devices;
write instructions corresponding to an optimized operational mode of the mobile computing device to the memory device, wherein the instructions corresponding to the optimized operational mode of the mobile computing device are based, at least in part, on the characteristics of the executed workloads based on the predetermined usage profile and the comparison of the determined usage profile to the aggregated collection of usage profiles;
monitor characteristics of one or more workloads executed subsequent to execution of the instructions corresponding to the optimized operational mode of the mobile computing device;
determine changes to the predetermined usage profile using the characteristics of the executed workloads based on the predetermined usage profile or the characteristics of the workloads executed subsequent to execution of the instructions corresponding to the optimized operational mode of the mobile computing device, or both; and
update at least one of the predetermined usage profile or the instructions corresponding to the optimized operational mode of the mobile computing device, or both, based on the determined changes of the one or more workloads executed by the processing unit subsequent to execution of the instructions corresponding to the optimized operational mode of the mobile computing device.

15. The system of claim 14, wherein the processing unit is to update the predetermined usage profile to one of a selectable number of usage profiles stored in the memory device.

16. The apparatus of claim 14, wherein the processing unit is to update the predetermined usage profile to one of a selectable number of usage profiles stored in the pool of computing resources of the distributed computing system.

17. The system of claim 14, wherein the processing unit is to:
allocate a first portion of the memory device for use during operation of the mobile computing device;
transfer a command to the distributed computing system to request allocation of a second portion of the memory device for use during operation of the mobile computing device;
receive an instruction to open the second portion of the memory device for use during operation of the mobile computing device; and
allocate the second portion of the memory device for use during operation of the mobile computing device in response to execution of the received instruction.

18. The system of claim 14, wherein the processing unit is to, as part of updating at least the one of the predetermined usage profile or the instructions corresponding to the optimized operational mode of the mobile computing device, or both, update a set of firmware instructions written to the memory device of the mobile computing device.

19. The system of claim 14, wherein the processing unit is to:
monitor user interaction with the mobile computing device to determine user priorities associated with the mobile computing device; and
update at least the one of the predetermined usage profile or the instructions corresponding to the optimized operational mode of the mobile computing device, or both, based on the monitored user priorities associated with the mobile computing device.

20. The system of claim 14, wherein the processing unit is to:
receive input corresponding to user priorities associated with the mobile computing device; and
update at least the one of the predetermined usage profile or the instructions corresponding to the optimized operational mode of the mobile computing device, or both, based on the user priorities associated with the mobile computing device.

21. The system of claim 14, wherein the instructions corresponding to the optimized operational mode of the mobile computing device include instructions corresponding to at least one of a battery life, a mobile computing device reliability, a device life of the mobile computing device, or a performance of the mobile computing device, or any combination thereof.

* * * * *